United States Patent Office 3,293,322
Patented Dec. 20, 1966

3,293,322
HOMOGENEOUS COPOLYMER OF EPOXY RESIN AND VINYL ARYL MONOMER, CURED WITH A BF$_3$-AMINE COMPLEX
Charles J. Pennino, Monroeville, Pa., assignor to Koppers Company, Inc., a corporation of Delaware
No Drawing. Filed Apr. 9, 1963, Ser. No. 271,599
4 Claims. (Cl. 260—837)

This invention relates generally to compositions containing epoxy resins.

Epoxy resins can be cured to polymers which show excellent strength, electrical properties, adhesion, and chemical resistance. Accordingly, compositions containing epoxy resins are widely used as adhesives, coatings and for the potting and encapsulating of electrical components.

The epoxy resin reacts so readily with most curing agents that a problem is presented in producing a composition that has a sufficiently long pot life as to be usable for common applications. The term "pot life" refers to the useful life of the composition before gelation takes plate. It is usual, therefore, to market the composition in the form of two separate containers. One holds the epoxy resin, and the other holds the curing agent. The contents of the two containers are mixed at the time of operation and then are used within the pot life time. In large-scale operations, this means that only enough of the mix to last a few hours is made and then at the end of this time, another batch is mixed. Such operations, of course, are troublesome and time and labor consuming.

Furthermore, epoxy resins are expensive. Also, they tend either to be solids or viscous liquids. This viscous nature of the epoxy resin is a particularly grave disadvantage in many applications. For example, if the epoxy resin is to be used for the potting or encapsulating of electrical windings, the epoxy resin composition must be fluid enough to flow readily into the windings. Both the expense and the viscosity can be reduced by the use of diluents.

The addition of solvents, plasticizers, and reactive materials, as diluents, present disadvantages. Solvents are not practical unless the solvent can be removed prior to application or during the curing, otherwise holes and bubbles will appear in the cured resins. Plasticizers cannot be used where heat-resistant properties are required as for applications in the electrical field. Ideally, the composition should consist of 100% solids; no solvents or non-reactive material being present. While this is possible with reactive diluents, such diluents have tended to stop the build up of the long polymer chains which are responsible for the excellent properties of the resins, i.e., to act as chain stoppers.

The vinyl monomers would appear to be desirable reactive diluents for epoxy resins. For example, styrene is relatively cheap; it is fluid, and it contains a vinyl group for polymerization and an aromatic group for solution compatibility with the epoxy resin. Thus, numerous attempts have been made to dilute epoxy resins with styrene. Frank E. Pschorr and Elliott N. Dormann, Society of Plastic Engineers Technical Papers, volume V, January 1959, pages 78 et seq. reported an extended study of reactive diluents in epoxy resin systems. They investigated a composition comprised of an epoxy resin along with a diluent and tetraethyl tetramine as a cross-linking agent. They found that where the epoxy resin had an original viscosity of 12,200 centipoises at 23° C. the addition of 7.7 parts of styrene per hundred parts of the epoxy resin reduced the viscosity to 1,500 centipoises, and the addition of 20 parts of styrene reduced the viscosity to 200 centipoises. They also found, however, that the flexural deformation temperature was drastically reduced—from 120° C. for the epoxy resin amine system to as low as 65° C. for the epoxy resin, styrene, amine system.

Rumscheidt and Bruin Patent No. 2,939,859 describe the diluting of epoxy resins with styrene and subsequent cross-linking with various amine and acid catalysts, preferably in combination with a free radical catalyst, for example, a peroxide such as ditertiary butyl peroxide. The reason for this preference is that the epoxy resin contains no unsaturated bonds to polymerize with the vinyl group of the styrene. Thus, the styrene tends to polymerize with itself, of course, more than it tends to polymerize with the epoxy resin. The use of a free radical catalyst for the polymerization of the styrene in addition to the cross-linking agent for the polymerization or cross-linking of the epoxy resin increased the opportunity for the vinyl group

to polymerize with the epoxy group

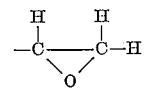

of the epoxy resin. Even so, Rumscheidt et al. found that considerable amounts of styrene did not react, and considerable amounts of polystyrene were formed when the free radical catalyst was omitted; and the free styrene and the polystyrene exist even when a free radical catalyst is present. (Example 1, Patent No. 2,939,859.) This leads to a product of heterogeneous composition and to a tendency of the two or more different polymer products to separate or form phases.

There has now been discovered, in accordance with this invention, a novel composition containing an epoxy resin, a reactive diluent and a single catalyst that catalyzes the copolymerization of the epoxy resin and the diluent to provide a cured homogeneous product. The resulting copolymerized composition has properties that are not far different from the properties of an undiluted but cured resin composition. This invention enables the expensive epoxy resin to be diluted with an inexpensive monomer to produce a novel composition that has a viscosity markedly lower than the viscosity of the epoxy resin. In fact, solid epoxy resins are readily used according to this invention. The final product, i.e., the cured composition of this invention, is a homogeneous composition despite wide variations in the ratio of ingredients.

An advantageous feature of this invention is that the novel composition has an indefinitely long storage life at ordinary room temperatures yet cures rapidly at elevated temperatures to yield a product having the desirable features of epoxy resin compositions. This enables a complete formulation to be marketed in one container ready for use.

The novel composition of this invention comprises an admixture of epoxy resin, a vinyl aryl monomer, and a boron trifluoride amine complex.

Any of the commercial epoxy resins which contain the viscinal epoxy linkages may be used in this invention. Epoxy resins which have enjoyed a high degree of commercial success are those resins sold under the trademark Epon and prepared from epichlorohydrin and polyhydric phenols, such as, 2,2'-bis-(para-hydroxyphenol) propane; those sold under the trademark Kopox and prepared from novolak resins and described in Patent No. 2,658,884; and those sold under the trademark Kopoxite and prepared from resorcinol. Epoxy resins are well known; for example, are classified by the United States Patent Office at this time in Class 260, Subclasses 2, 42, 47, and 348.

Advantageously, the vinyl aryl monomer used in this invention is styrene. It may be a commercial grade styrene which normally boils at about 145° C. and is of about 99.5% purity. Usually, the monomer is stabilized by the addition of an inhibitor, such as for example, by the addition of 0.01% hydroquinone. Advantageously, this is removed before use by washing or distillation.

The catalyst for copolymerizing the epoxy resin and the vinyl monomer is a commercially available complex formed by neutralizing boron trifluoride with an amine. Boron trifluoride, itself, is a gas; it is highly acid and highly corrosive; and it is capable of catalyzing the polymerization of epoxy compounds in a matter of minutes or even seconds at room temperature. Boron trifluoride amine complexes, on the other hand, are solids at room temperature and catalyze the polymerization of epoxy compounds at elevated temperatures. The complexes are usually equimolar in ratio; that it, one mole of boron trifluoride per mole of amine. The unique action of the complex in the coreaction of epoxies and olefins depends on the solubility of the complex in the mixtures of epoxy and monomer and the stability of the complex formed by the electron pair of the boron trifluoride and of the nitrogen-containing molecule:

An elevated temperature is needed to dissociate the complex to permit catalytic reaction. The general order of activity of the boron trifluoride amine complexes depends on the nature of the amine.

Primary>Secondary>Tertiary

The nature of the nitrogen compound will have, therefore, an effect in deterring or promoting the rate of reaction at lower or higher temperatures, thus controlling the stability of the solution and properties. The complexes vary in solubility and in melting points according to the nature of the amine.

While the exact nature of the coreaction of the epoxy resin and vinyl aryl monomer that occurs in the curing of the composition is not entirely known, it is postulated that the cured product reaction of the epoxies with the vinyl bond is a copolymerization involving the moieties I and/or II.

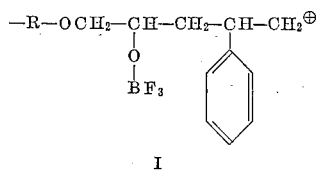

I

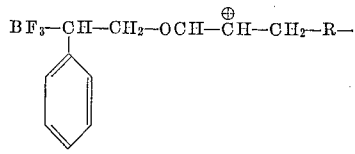

II

The incompatibility of polystyrene and epoxy polymer and the resistance of the copolymerizate to solvents, its low heat loss, and its high deflection temperatures support the proposal. The resistance of the polymerization product to toluene (which is an excellent solvent for polystyrene) at room and elevated temperatures is excellent as determined by changes in surface hardness and weight after Soxhlet extraction. Infrared analysis of the cured product indicates the absence of free vinyl monomer.

The copolymerizate is a clear transparent, homogeneous, hard solid with slight tannish color. The copolymerizate has about the same over-all characteristic properties as does undiluted epoxy resins that have been cured with boron trifluoride amine complexes. Such properties include mechanical strength, heat resistance, chemical resistance, and electrical resistance. Slight changes in properties occur with the use of widely varying amounts of styrene. For example, extremely higher concentrations of styrene lower the deflection temperature and lessen the heat resistance. At high concentrations of styrene, a slight sacrifice in properties occurs, but large benefits are gained in lowered costs of the composition. Thus, an economic balance can be made of the costs and properties desired.

The proportions of the ingredients of this invention are not particularly critical. The vinyl aryl monomer and epoxy resin may be in proportions which range as little as 0.1 part by weight per hundred parts by weight of epoxy resin to 85 parts by weight of vinyl monomer per hundred parts by weight of epoxy resin. High viscosity epoxy resins and solid epoxy resins readily dissolve in the liquid styrene to form solutions which are readily pourable. This has the advantage that the decreased viscosity of the semi-solid or solid resin helps the introduction or solution of the boron trifluoride amine complex to render the composition homogeneous. Heretofore, it has been difficult to obtain a homogeneous admixture of thick and viscous or solid resins with the solid catalysts. The amount of catalysts used for the coreaction of the epoxy and vinyl components can vary from 1 to 10 parts by weight per 100 parts of epoxy resin. More catalyst can be used at low concentrations of styrene without additional notable advantages. With high concentrations of styrene, i.e., 85 parts by weight of styrene per 100 parts by weight of epoxy resin, additional catalysts can be beneficial. The solution of the catalyst in the liquid is, of course, desirable. Thus, the proportion of catalyst component specified is not a precise limit but is decided by such factors as the desirable care time, the catalyst cost, and the temperature at which the curing is effected. The preferred catalyst is boron trifluoride monoethyl amine complex.

Various ingredients such as dyes, pigments, fillers, and the like, may be used in the composition of this invention, depending upon the application and purpose for which the composition is to be employed. For example, the composition may be modified or extended by a variety of fibrous and finely divided inert filler material such as fuller's earth, talc. quartz flour, asbestos, glass filaments, etc. The electrical, physical or chemical properties of cured products of the novel compositions may be modified by incorporation of plasticizers, resins, conductive materials such as carbon black, metal powders, and the like.

A great advantage of the composition of this invention is that the entire composition may be mixed and handled in a single package. The composition has an indefinite storage life at ordinary room temperature. The viscosity slowly increases in the space of a year and this is evidence of a slow reaction over extended periods of time. Practical reactions or cures require heat to promote a reasonable rate of reaction. The composition cures rapidly at elevated temperatures of 100–200° C. Temperatures, however, exceeding the dissociation temperature of the boron trifluoride amine complex can cause excessive discoloration and even decomposition of the mass depending on the epoxy resin. High dilutions of vinyl monomer retard the discoloration, perhaps by permitting better heat transfer thereby dissipating the initial exothermic heat of reaction during the gelation period. Small castings can be gelled at 100–105° C. in 2 to 3 hours depending on the size and shape of the casting. Larger castings are possible by prolonging the gel time at lower temperatures, 90° C., followed by a short period at 105° C. to attain complete gelation. The castings and boron trifluoride nitrogen complexes are generally clear and low in color after gelation and curing at elevated temperatures. At very high concentrations of styrene, the gelled mass and/or cured casts are translucent. The ultimate curing temperatures will be determined by the intended uses for the resin system and the properties desired. After gelation, the temperature may be raised, for example, to 150° C. Where higher, flexural distortion temperatures are desired, the castings may be given a further or post-cure at 200° C.

The invention will be illustrated further by the following examples wherein parts are parts by weight. Unless otherwise specified, the tests were performed in accordance with A.S.T.M. procedures. For instance, ultimate flexural strength was determined in accordance with test method ASTM D790–49T, dielectric properties in accordance with ASTM D149–55T, flexural deformation temperature in accordance with ASTM D648–56 (264 p.s.i.) and solvent resistance in accordance with ASTM D570–54T.

*Example I*

Mixtures were made of 100 parts of the diglycidyl ether of bis-phenol A (Epon 828) (180–195 epoxide equivalent or grams of resin containing one gram equivalent of epoxide), and various parts of styrene. The compositions were gelled by maintaining them at 105° C. for 15 hours and curing completed by maintaining them at 150° C. for 15 hours. Specimens were post-cured by maintaining them at 200° C. for 24 hours. The properties are tabulated below:

| Formulation: | | | | | |
|---|---|---|---|---|---|
| Parts diglycidyl ether | 100 | 100 | 100 | 100 | 100 |
| Parts styrene | | 10 | 25 | 45 | 85 |
| Parts BF₃.EtHN₂ | 5 | 5 | 5 | 5 | 5 |
| Viscosity, cps., 25° C | 15,500 | 1,250 | 250 | 25 | <5 |
| Properties: | | | | | |
| Hellige Color | 3–4 | 5 | 5 | 5 | (¹) |
| Barcol Hardness | 92–94 | 83–85 | 83–84 | 84–85 | 82–83 |
| Flex. Deformation Temp.² | 180–190 | 140(+) | 125–130 | 117 | 103 |
| Flex. Strength, p.s.i | 15,300 | 16,100 | 16,100 | 15,300 | 16,300 |
| Flex. Modulus, 10⁻⁶ p.s.i | 0.42 | 0.43 | 0.45 | 0.44 | 0.47 |
| Post-Cured, 24 hours at 200° C.: | | | | | |
| Flex. Deformation Temp | 147 | 137 | 131 | 128 | 108 |
| Flex. Strength, p.s.i | 19,700 | 19,000 | 17,400 | 14,800 | |
| Flex. Modulus, 10⁻⁶ p.s.i | 0.39 | 0.43 | 0.43 | 0.48 | |
| Wt. Loss, percent at 200° C.: | | | | | |
| 1 day | 0.2 | 0.6 | 0.6 | | 2.5 |
| 7 days | 1.1 | 2.3 | 2.3 | 3.5 | |

¹ Light tan translucent.
² Also known as Heat Distortion Temperature and Deflection Temperature (DT).

*Example II*

To determine the effect of toluene on the surface hardness of the products of Example I, the products were soaked in toluene for varying lengths of time and the surface hardness measured. The results in terms of Barcol hardness were:

| Immersion Time | Parts styrene per 100 parts epoxy resin | | | |
|---|---|---|---|---|
| | 25 | 45 | 56 | 85 |
| Original | 83–84 | 83–85 | 84–85 | 82–83 |
| 1 day | 81–84 | 83–85 | 82–84 | 82–84 |
| 7 days | 82–84 | 83–85 | 85–86 | 78–80 |
| 21 days | 82–85 | 83–85 | 84–86 | 73–75 |

*Example III*

The procedure of Example II was followed except that acetone was substituted for toluene. The results in Barcol hardness were as follows:

| Immersion Time | Parts styrene per 100 parts epoxy resin | | | |
|---|---|---|---|---|
| | 25 | 45 | 56 | 85 |
| Original | 83–84 | 83–85 | 84–86 | 82–83 |
| 1 day | 71–73 | 69–71 | 68–70 | 55–58 |
| 7 days | 60–65 | 55–60 | 47–50 | 35–45 |
| 21 days | 50–55 | 48–50 | 35–40 | weak |

*Example IV*

Separate mixtures were made of 100 parts of the diglycidyl ether of bis-phenol A (Epon 828), 25 parts of styrene, and the indicated amounts of different boron trifluoride amine complexes to give the same content of boron trifluoride in each mixture. Each mixture was cast as slabs in accordance with the appropriate ASTM test standard, then maintained at a temperature of 105° C. for 4 hours to gel the castings, and thereafter maintained at a temperature of 150° C. for 15 hours to complete the curing. To indicate the effect of heat aging, a set of castings were further heated for 24 hours at 200° C., and then tested. The results are tabulated below:

| | Amine of the Catalyst Complex | | |
|---|---|---|---|
| | Cyclohexyl-amine | Piperi-dine | Ethyl-amine |
| Hellige Color | 6 | 5 | 6 |
| Barcol Hardness | 83–84 | 80–83 | 78–79 |
| Flexural Deformation Temp | 136 | 62 | 125 |
| Flexural Strength, p.s.i | 15,700 | 16,100 | 16,100 |
| Flexural Modulus, ×10⁻⁶ p.s.i | 0.43 | 0.53 | 0.45 |
| Post Cured: 24 hours at 200° C.: | | | |
| Flexural Deformation Temp | 135 | 153 | 131 |
| Percent Weight Loss at 200° C.: | | | |
| 24 hours | 0.74 | 0.49 | 0.62 |
| 7 days | 0.87 | 1.04 | 0.98 |
| 30 days | 4.1 | 2.6 | 3.9 |

*Example V*

To compare the effect of various vinyl aryl monomers, mixtures were made of 100 parts of diglycidal ether derived from bis-phenol A (Epon 828), 25 parts of vinyl monomer, and 5 parts of boron trifluoride ethyl amine complex. The mixtures were gelled by maintaining them at 105° C. for 5 hours, and the cure completed by maintaining them at 150° C. for 16 hours. Thereafter, portions were subjected to a post-cure of 24 hours at 200° C. The results for each mixture are tabulated below under the appropriate column headed by the vinyl aryl monomer employed.

| | Controls | | Styrene | Vinyl Toluene | Divinyl Benzene | Vinyl Naphthylene | Ace-naphthylene |
|---|---|---|---|---|---|---|---|
| | None | 85% NMA | | | | | |
| Hellige Color | 3-4 | 7 | 5 | 4 | 6 | Opaque | 16 |
| Barcol Hardness | 92-94 | 85-86 | 82-84 | 82-83 | 88-89 | 84-86 | 84-85 |
| Flexural Deformation Temp., °C | 180-190 | 148 | 125 | 122 | 135 | 131 | 124 |
| Flexural Strength, p.s.i | 15,300 | 19,000 | 16,100 | 16,500 | 14,411 | 18,000 | 19,300 |
| Flexural Modulus, $10^{-6}$ | 0.42 | 0.39 | 0.45 | 0.40 | 0.41 | 0.47 | 0.54 |
| Weight Loss, Percent: | | | | | | | |
| 24 hours, 200° C | 0.2 | 0.3 | 0.62 | 0.96 | 0.5 | 0.54 | 0.41 |
| 7 days, 200° C | 1.1 | 0.5 | 2.0 | 1.73 | 1.06 | 2.4 | 1.4 |
| Post Cure: 24 hours at 200° C.: | | | | | | | |
| Flexural Deformation Temp., °C | 147 | 155 | 131 | | | | 140 |
| Flexural Strength, p.s.i | 19,700 | 18,400 | 17,400 | 16,600 | 17,200 | 19,300 | 18,500 |
| Flexural Modulus, $10^{-6}$ | 0.39 | 0.39 | 0.43 | 0.43 | 0.48 | 0.47 | 0.48 |

To provide a control for comparison purposes, a mixture was made of the diepoxide, Epon 828, and 5 parts of the boron trifluoride ethyl amine complex; and the mixture cured under the same conditions as the epoxy resin, vinyl aryl monomer and catalyst complex. For further comparison, the epoxy resin, Epon 828, was mixed with the well-known nadic methyl anhydride, and cured in a conventional manner; the composition was gelled at 80° C. and thereafter cured at 180° C. for 5 hours.

*Example VI*

Mixtures were made of 100 parts of various epoxy resins, 5 parts of boron trifluoride ethyl amine complex, and varying amounts of styrene. The mixtures were gelled by maintaining them at 105° C. for 16 hours and the cure completed by maintaining them at 150° C. for 16 hours. The characteristics of these resins are described below:

| Resin | Resin Viscosity, cps., 25° C. | Epoxy Equivalent | Parts Styrene | Solution Viscosity, cps., 25° C. | Hellige Color | Barcol Hardness | F.D.T., °C., 264 p.s.i. |
|---|---|---|---|---|---|---|---|
| A | 15,000 | 187 | 25 | 200-250 | 5 | 81-82 | 125-130 |
| | | 187 | 45 | 30 | 5 | 80-83 | 117 |
| B | Melting point, 65-75. | 450-475 | 36 | Poured at r.t. | | | 83 |
| C | | 128 | 25 | 10 | | | 136 |
| D | Sp. (35° C.) | 200 | 25 | 500 | 8 | 88-90 | 160 |
| | | 200 | 52 | 375 | 9 | 87-88 | 128 |
| E | Sp. (73° C.) | 225 | 25 | 16,300 | 18+ Dk. brown transluc. | 90-91 | |
| | | 225 | 46 | 1,200 | | 87-88 | 165 |
| F | 430,000 (40° C.) | 147 | 36 | 430 | Dark—transluc. | 92-93 | 207 |
| G | 113,000 | 144 | 36 | 420 | 9 | 90-91 | 167 |

A—The diglycidyl ether of bis-phenol A (Epon 820).
B—The diglycidyl ether of bis-phenol A (Epon 1001).
C—Resorcinol diglycidyl ether (Kopoxite).
D—Epoxy alkyl novolak (Kopox 357A).
E—Epoxy alkyl novolak.
F—Triglycidyl ethers of trihydroxy diphenyl (RDR 700).
G—Triglycidyl ethers of trihydroxy diphenyl (RDR 701).

*Example VII*

To illustrate the storage stability of the novel composition, a solution was made of 100 parts of the diglycidyl ether of bis-phenol A (Epon 830) (original viscosity 20,000 centipoises), 25 parts of styrene, and 5 parts of boron trifluoride ethyl amine complex. The characteristics of the composition and the products made therefrom are illustrated below:

| Age of Formulation | Freshly prepared | Seven months later |
|---|---|---|
| Brookfield Viscosity, cps., 24° C | 350 | 12,000 |
| Hellige Color | 5 | 6 |
| Barcol Hardness | 82-84 | 81-82 |
| DT, °C | 125 | 130 |
| Flexural Strength, p.s.i | 16,000 | 16,700 |
| Flexural Modulus, $\times 10^{-6}$ | 0.45 | 0.45 |
| Heat Aged 24 hours at 200° C.: | | |
| DT, °C | 131 | 134 |
| Flexural Strength, p.s.i | 17,400 | 16,500 |
| Flexural Modulus, $\times 10^{-6}$ | 0.43 | 0.45 |
| Wt. Loss, percent | 0.62 | 0.55 |

Products were made from the composition by maintaining the composition at a temperature of 105° C. for 15 hours to gel the composition and thereafter the composition maintained at 150° C. for 15 hours to complete the curing.

*Example VIII*

A mixture was also made of 100 parts of the diglycidyl ether of bis-phenol A (Epon 828), 25 parts of styrene, and 5 parts of a boron trifluoride-ethyl amine complex. The composition had an original Brookfield viscosity of 205 centipoises. The composition at the age of one month had a viscosity of 340 centipoises. At an age of two months, the viscosity was 360 centipoises and at an age of seven months, the viscosity was 12,000 centipoises. After aging for a year, the composition had become viscous but flowed freely when heated to 60° C.

*Example IX*

A solution of 100 parts of diglycidyl ether of bis-phenol A (Epon 830), 55 parts of styrene, and 5 parts of boron trifluoride-cyclo-hexamine had an original viscosity of 27 centipoises at 25° C. and after four months aging had a viscosity of 110 centipoises at 25° C.

*Example X*

A control composition A was made of 100 parts of a diglycidyl ether of bis-phenol A (Epon 828) and 5 parts of a boron trifluoride-ethyl amine complex. Another composition B was prepared of 100 parts of a diglycidyl ether of bis-phenol A (Epon 828), 25 parts of styrene, and 5 parts of a boron trifluoride-ethyl amine complex. The compositions were gelled by maintaining them at a temperature of 105° C. for 16 hours and cured by maintaining the compositions at a temperature of 150° C. for 16 hours. The resistances of the cured products to various common solvents are illustrated below:

|  | A | | B | |
|---|---|---|---|---|
|  | Percent Wet Wt. Increase | Percent Dry Wt. Increase | Percent Wet Wt. Increase | Percent Dry Wt. Increase |
| Distilled Water | 0.72 | 0.42 | 0.52 | 0.17 |
| 5% NaOH | 0.64 | 0.34 | 0.42 | 0.11 |
| 30% H$_2$SO$_4$ | 0.54 | 0.34 | 0.20 | 0.03 |
| Acetic Acid (gl.) | 0.09 | 0.15 | 0.11 | 0.02 |
| Acetone | 0.42 | 0.31 | 2.87 | 1.26 |
| Toluene | 0.17 | 0.18 | 0.03 | (−0.06) | hydroxide. Compositions of the epoxide were made with various proportions of styrene and 5 parts of a BF$_3$ monoethylamine complex were added per 100 parts of catalyst per hundred parts of epoxy resin. The compositions were gelled by maintaining them at a temperature of 100° C. for 2½ hours and thereafter the cure completed by maintaining them at a temperature of 150° C. for 15 hours. The cured composition was transparent, light tan in color, and extremely hard and tough. An infrared analysis revealed no residual monomer to be present.

The products were finely ground and placed in a Soxhlet extractor and extracted with hot methylethyl ketone. The results are compared below with the results shown in Example I of the Rumscheidt et al. Patent No. 2,939,859.

| Weight Ratio Polyether to Styrene | Piperidine | Peroxide Percent on Styrene | BF$_3$C+MH$_2$ | Extract Percent of Total Product | | |
|---|---|---|---|---|---|---|
|  |  |  |  | Volatile | Nonvolatile | Total |
| 100:0 | 6 | 0 | 0 | 0 | 1.5 | 1.5 |
| 100:0 | 0 | 0 | 5 | 0 | 0 | 0 |
| 90:10 | 6 | 0 | 0 | 6.6 | 2.0 | 8.6 |
| 90:10 | 6 | 10 | 0 | 1.3 | 1.2 | 2.5 |
| 90:10 | 0 | 0 | 5 | 0.0 | 0.0 | 0.0 |
| 80:20 | 6 | 12 | 0 | 0.4 | 2.2 | 2.6 |
| 80:20 | 0 | 0 | 5 | 0.0 | 0.0 | 0.0 |

*Example XI*

To illustrate the electrical properties of the products of invention, compositions were prepared comprised of 100 parts of various epoxy resins, 25 parts of various vinyl monomers, and 5 parts of boron trifluoride-ethyl amine complex. The compositions were gelled by maintaining them at a temperature of 105° C. for 15 hours and thereafter cured by maintaining them at a temperature of 150° C. for 15 hours. As controls for comparison, compositions of 100 parts of the diglycidyl ether of bis-phenol A (Epon 815) diluted with 10 to 12 parts per hundred of butyl diglycidyl ether, of another diglycidyl ether of bis-phenol A (Epon 828), and an epoxy alkyl novolak (Kopox) were made with 5 parts of the boron trifluoride amine and cured under the same conditions. The properties are described below:

The same results were obtained when attempts were made to extract the products with toluene which is an excellent solvent for styrene and polystyrene.

*Example XIII*

Mixtures numbered 1 and 6 were made in accordance with the invention. Mixture No. 1 consisting of 100 parts of the diglycidyl ether of bis-phenol A (Epon 828), 25 parts of styrene, and 5 parts of boron trifluoride ethyl amine complex and mixture No. 6 consisting of 100 parts of the diglycidyl ether of bis-phenol A (Epon 828), 45 parts of styrene, and 5 parts of a boron trifluoride ethyl amine catalyst. These compositions were gelled by maintaining them at a temperature of 105° C. for 5 hours and curing completed by maintaining them at a temperature of 150° C. for 15 hours. Mixtures Nos. 2, 3, 4, 5, 7, and

|  | Cycles, 1 Sec. | Epon 815 | Epon 828 Plus Styrene | Epon (828) Plus Divinylbenzene | Kopox | Kopox Plus Styrene |
|---|---|---|---|---|---|---|
| Dielectric Constant | 60 | 3.59 | 3.10 | 3.46 | 3.58 | 3.21 |
|  | 1K | 3.54 | 3.08 | 3.43 | 3.54 | 3.20 |
|  | 10K | 3.53 | 3.06 | 3.40 |  | 3.18 |
|  | 100K | 3.44 | 3.02 | 3.34 | 3.44 | 3.15 |
|  | 25M |  | 2.88 | 3.05 | 3.34 | 3.05 |
|  | 71M | 3.13 |  |  |  |  |
| Dissipation Factor, 10$^3$ | 60 |  | 2.9 | 3.0 | 5.9 | 3.7 |
|  | 1K | 5.0 | 3.5 | 4.8 | 6.5 | 4.2 |
|  | 10K | 8.6 | 7.8 | 9.6 |  | 6.4 |
|  | 100K | 17.1 | 13.9 | 16.9 | 13.3 | 9.7 |
|  | 25M |  | 10.2 | 14.0 | 10.0 | 8.7 |
|  | 71M | 21.0 |  |  |  |  |
| Loss Factor, 10$^3$ | 60 |  | 9.0 | 10.4 | 21.1 | 11.9 |
|  | 1K | 18.0 | 10.8 | 16.5 | 23.0 | 13.4 |
|  | 10K | 30.0 | 23.9 | 32.6 |  | 20.4 |
|  | 100K | 58.0 | 42.0 | 56.4 | 45.8 | 30.6 |
|  | 25M |  | 29.4 | 42.7 | 33.4 | 26.5 |
|  | 71M | 66.0 |  |  |  |  |
| Surface Resistivity (ohm) |  | 9.0×10$^{17}$ | 1.7×10$^{15}$ | 3.39×10$^{17}$ | 7.1×10$^{18}$ | 1.88×10$^{18}$ |
| Volume Resistivity (ohm-cm.) |  | 3.5×10$^{16}$ | 3.26×10$^{16}$ | 1.09×10$^{16}$ | 2.2×10$^{17}$ | 3.11×10$^{16}$ |

*Example XII*

A glycidyl polyether having a molecular weight of 470, a softening point of 25° C., an epoxy value of 0.4 epoxide equivalents per hundred grams, was prepared by the condensation of bis-phenol 2,2'-bis(4-hydroxyphenyl)propane and epichlorohydrin in aqueous media with sodium 8 were made in accordance with the teachings of Rumscheidt et al. Patent No. 2,939,859, formulation 2 consisting of 100 parts of the diglycidyl ether of bis-phenol A (Epon 828), 25 parts of styrene, and 6 parts of piperidine. Mixture No. 3 was identical to mixture No. 2 except that 3 parts (12% based on the weight of styrene) of ditertiary butyl peroxide were also added. Mixture No. 4 consisted of 100 parts of the diglycidyl ether of bis-phenol A (Epon 828) and 10.3 parts of diethylene tetramine. Mixture No. 5 was identical to mixture No. 4 except that 2½ (10% based on the weight of styrene) parts of ditertiary butyl peroxide were added. Mixture No. 7 consisted of 100 parts of the diglycidyl ether of bis-phenol A (Epon 828), 45 parts of styrene, and 10.3 parts of diethylene tetramine; and mixture No. 8 was identical to mixture No. 7 except that 4.5 parts (10% based on the weight of styrene) of ditertiary butyl peroxide were added. Mixtures Nos. 2, 3, 4, 5, 7, and 8 were maintained at a temperature of 40° C. for 3 hours then maintained at 105° C. for 5 hours and thereafter maintained at 150° C. for 15 hours. The results are tabulated below:

| Formulations | 1 | 2 | 3 | 4 | 5 | 6 | 7 | 8 |
|---|---|---|---|---|---|---|---|---|
| Styrene | 25 | 25 | 25 | 25 | 25 | 45 | 45 | 45. |
| Piperidine | | 6 | 6 | | | | | |
| Diethylenetriamine | | | | 10.3 | 10.3 | | 10.3 | 10.3. |
| Ditertiary butyl peroxide | | | | | 10% | | | 10%. |
| BF$_3$·EtNH$_2$ | 5 | | 12% | | | 5 | | |
| Pot life | >1 yr | 56 hrs | | 3 hrs | | | | |
| Properties: | | | | | | | | |
| Appearance | Clear, transparent. | Clear, transparent, two phases. | Opaque, dark. | Crazed and cracked. | Dark, translucent. | Clear, transparent. | Badly cracked. | Dark, opaque, two phased. |
| Hellige Color | 5 | | 17+ | 5 | 18+ | 5 | | |
| Barcol Hardness | 81–82 | | 74–75 | 78–81 | 83–85 | 80–83 | | 80–82. |
| DT, ° C | 125–130 | | 83 | 94 | 103 | 117 | | 90. |
| Flex. Strength, p.s.i | 16,000 | | | 16,900 | 16,000 | 15,300 | | 17,300. |
| Flex. Modulus, ×10$^{-6}$ | | | | | | | | |
| Chemical Resistance: | | | | | | | | |
| Percent Wt. Increase | | | | | | | | |
| Acetone Wet/Dry | 2.9/1.4 | | Disintegrates. | 5.1/3.0 | 3.5/2.0 | | | |
| Toluene Wet/Dry | 0.03/ | | | 0.7/ | 0.02/ | | | |
| Heat aged: 24 hours at 200° C.: | | | | | | | | |
| DT, ° C | 135 | | 92 | 105 | 103 | | | |
| Flex. Strength, p.s.i | 17,000 | | | 12,400 | 12,600 | 14,800 | | 8,700. |
| Percent Retention | 100 | | | 73 | 75 | 97 | | 50. |
| Flex. Modulus, ×10$^{-6}$ | 0.43 | | | 0.43 | 0.44 | 0.48 | | 0.47. |
| Percent Wt. Loss | 0.60 | 7.4 | 0.86 | 2.74 | 0.82 | 0.65 | | Unstable at 150° C. |
| Barcol Hardness at 200° C | 40 (tough) | 0 | 0 | 0 (Soft, weak and rubbery) | 0 | 40 | | |

The mixtures 2, 4, 7, and 8 obviously showed two phases. The top layer actually lifted from mixtures 4 and 5 when the products were heated at 200° C. With mixture No. 2, a casting one-half inch deep showed a Barcol hardness at the top surface of 71 but of only 59 on the bottom surface. Mixtures Nos. 1 and 6, however, were homogeneous throughout and were single phase throughout and showed the same Barcol hardness for the top and bottom surfaces. In the particular characteristics of heat aging which is so important in for example the case of windings for electric motors, mixtures Nos. 1 and 6 showed little loss in weight and excellent retention of Barcol hardness at 200° C. Mixtures Nos. 2, 3, 4, and 5, on the other hand, were weak, soft, cheesy materials at a temperature of 200° C. It is felt that the difference in action lies in the fact that the product, according to this invention, consists of chains having the elements carbon and oxygen whereas the chains of the mixtures 2, 3, 4, and 5 contain the elements nitrogen along with the elements carbon and oxygen.

The foregoing has described novel epoxy resin compositions which are storage stable and relatively inactive at room temperatures but which cure to hard, tough solids upon brief heating at moderate temperatures. The curing reaction proceeds smoothly and uniformly without formation of water or other volatiles. The compositions are much less expensive than the normal epoxy resin compositions yet still retain the desirable properties when the compositions are cured. The cured products are hard, tough, and strong. They adhere firmly to surfaces of most materials with which in contact during the curing operation. They are chemically quite inert, being highly resistant to solvents, acids and other chemical reagents. Electrically, they are characterized by low power factor (low dissipation factor), low dielectric constant.

The liquid compositions are particularly useful, because of their low viscosity and high Flexural Heat Distortion Temperature, for impregnating and embedding compounds for electrical coils and other electrical components. Their low viscosity enables them to penetrate between the windings of the coil to provide complete impregnation. When cured, they form hard, tough, firmly adherently-bonded resinous components having excellent insulating and protective properties. The compositions also are useful as abrasive binders in making abrasive-coated sheet materials, abrasive wheels, and discs. They are also useful in making fiber-reinforced structures such as tubes, plates, beams, wheels, rods and sheets in which woven or unwoven fibers or filaments are bonded into a unitary structure of exceptionally high strength and shock resistance by means of the cured epoxy resin. The low viscosity is achieved while still retaining a composition of 100% solids.

I claim:

1. A self-curing composition which is essentially free of volatile solvents and in the absence of a filler can be maintained in a liquid state at normal room temperature for at least six months, but which will cure at elevated temperatures consisting essentially of a mixture of:
    (1) 100 parts by weight of an epoxy ether resin,
    (2) from 0.1 to 85 parts of a vinyl aryl monomer, and
    (3) from 1 to 10 parts of a single catalyst that is a boron trifluoride amine complex that catalyzes the copolymerization of the epoxy resin and said monomer to provide a cured homogeneous product, said cured product being characterized by the substantial absence of solvent extractable polystyrene.

2. A composition which cures at elevated temperatures and which is essentially a solution capable of producing 100% solids consisting essentially of a mixture of:
    (1) 100 parts by weight of a glycidyl ether formed by the condensation of epichlorohydrin and a polyhydroxy aromatic compound,
    (2) from 0.1 to 85 parts of styrene, and
    (3) from 1 to 10 parts of a single catalyst that is a boron trifluoride ethyl amine complex that catalyzes the copolymerization of the epoxy resin and said monomer to provide a cured homogeneous product, said cured product being characterized by the substantial absence of solvent extractable polystyrene.

3. A process for producing cured products comprising:
    (a) forming a low-viscosity mixture consisting essentially of 100 parts by weight of an epoxy ether resin, 0.1 to 85 parts by weight of a vinyl aryl monomer and from 1 to 10 parts of a single catalyst that is a boron trifluoride amine complex,
(b) subjecting said mixture to an elevated temperature to cure it to a tough, hard product, said cured product being characterized by the substantial absence of solvent extractable polystyrene.

4. A process for producing a cured product comprising:
(a) preparing a composition that is stable in a low-viscosity liquid for at least 6 months,
(b) blending together as essentialy the sole ingredients of the composition:
    (1) 100 parts by weight of an epoxy ether resin,
    (2) from 0.1 to 85 parts of a vinyl aryl monomer, and
    (3) from 1 to 10 parts of a single catalyst that is a boron trifluoride amine complex, and
(c) curing said composition by subjecting the composition to an elevated temperature of at least 100° C., said cured product being characterized by the substantial absence of solvent extractable polystyrene.

References Cited by the Examiner

UNITED STATES PATENTS

| 2,939,859 | 6/1960 | Rumscheidt et al. | 260—837 |
| 3,098,054 | 7/1963 | Rosenberg | 260—837 |
| 3,099,638 | 7/1963 | Foster | 260—837 |

FOREIGN PATENTS 591,565  1/1960  Canada.

OTHER REFERENCES

Lee et al.: Epoxy Resins, McGraw-Hill Book Co. Inc., New York, 1957, pages 111–2 relied upon.

MURRAY TILLMAN, *Primary Examiner.*

P. LIEBERMAN, *Assistant Examiner.*